United States Patent
Barajas, Jr. et al.

(10) Patent No.: US 12,285,133 B2
(45) Date of Patent: *Apr. 29, 2025

(54) OUTDOOR GRIDDLE STATION WITH GREASE MANAGEMENT SYSTEM

(71) Applicant: Nexgrill Industries, Inc., Chino, CA (US)

(72) Inventors: Wilfrido Barajas, Jr., Riverside, CA (US); Sherman Lin, Chino Hills, CA (US); Andre DeBeer, Chino, CA (US)

(73) Assignee: Nexgrill Industries, Inc., Chino, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/629,430

(22) Filed: Apr. 8, 2024

(65) Prior Publication Data
US 2024/0285120 A1   Aug. 29, 2024

Related U.S. Application Data

(63) Continuation of application No. 17/381,763, filed on Jul. 21, 2021, now Pat. No. 11,980,322.

(Continued)

(51) Int. Cl.
*A47J 37/06* (2006.01)
*F24C 15/14* (2006.01)

(52) U.S. Cl.
CPC ............ *A47J 37/067* (2013.01); *F24C 15/14* (2013.01)

(58) Field of Classification Search
CPC ...... F24C 15/08; F24C 15/14; F24C 15/2042; A47J 37/067; A47J 37/0676;

(Continued)

(56) References Cited

U.S. PATENT DOCUMENTS 2,362,757 A    11/1944   Lang
3,317,709 A     5/1967   Beasley
(Continued)

FOREIGN PATENT DOCUMENTS

CN         209235884 U    8/2019
JP           S62-6503 U    1/1987
KR     10-2009-0058116 U    6/2009

OTHER PUBLICATIONS

Blackstone, Blackstone Liquid Propane Table Top Outdoor Griddle Stainless Steel, on sale since Dec. 2015.

*Primary Examiner* — Hung D Nguyen
(74) *Attorney, Agent, or Firm* — Balch and Bingham, LLP

(57) ABSTRACT

System involved with but not limited to an apparatus including an outdoor griddle station with a system capable of communicating grease and other food byproducts from the cooking surface to a receptacle. A downwardly sloping opening in the cooking surface of the griddle member is disposed in nesting relation to and fluid communication with a basin situated beneath the griddle member. The basin is attached to a duct, forming a fluid transfer assembly that may pass through the heat source housing of the griddle station. The fluid transfer assembly is disposed over a receptacle capable of holding fluids. The receptacle may be removably supported by a bracket seat attached to the base of the griddle station such that the receptacle may be capable of being removed and replaced. In addition, other aspects are described in the claims, drawings, and text forming a part of the present disclosure.

15 Claims, 15 Drawing Sheets

Related U.S. Application Data

(60) Provisional application No. 63/054,527, filed on Jul. 21, 2020.

(58) Field of Classification Search
CPC ............... A47J 37/0704; A47J 37/0713; A47J 37/0781; A47J 37/0786
USPC .......................................... 99/422, 425, 444
See application file for complete search history.

(56) References Cited

U.S. PATENT DOCUMENTS

| | | | |
|---|---|---|---|
| 3,444,805 A * | 5/1969 | Mitter | A47J 37/0676 |
| | | | 126/41 R |
| 4,517,886 A | 5/1985 | Bales | |
| 4,607,609 A | 8/1986 | Keating | |
| 4,773,319 A | 9/1988 | Holland | |
| 4,909,137 A | 3/1990 | Brugnoli | |
| 5,313,877 A | 5/1994 | Holland | |
| 5,413,032 A * | 5/1995 | Bruno | A47J 37/0676 |
| | | | 99/422 |
| 5,529,798 A | 6/1996 | Clark | |
| 5,713,265 A | 2/1998 | Strader | |
| 5,911,812 A | 6/1999 | Stanek | |
| 6,962,106 B2 | 11/2005 | Mraldo | |
| 7,635,827 B2 | 12/2009 | Sie | |
| 9,192,178 B2 | 11/2015 | Berge | |
| 9,192,265 B1 * | 11/2015 | Johnson | A47J 37/1285 |
| 10,001,283 B2 | 6/2018 | Kramer | |
| 10,952,564 B2 | 3/2021 | Dahle | |
| 2003/0041744 A1 * | 3/2003 | Stephen | A47J 37/0786 |
| | | | 99/450 |
| 2014/0352551 A1 | 12/2014 | Ducate | |
| 2015/0335200 A1 | 11/2015 | Ortner | |
| 2017/0319007 A1 | 11/2017 | Bowens | |

* cited by examiner

OUTDOOR GRIDDLE STATION WITH GREASE MANAGEMENT SYSTEM

CROSS-REFERENCE TO RELATED APPLICATION

This non-provisional application is a continuation of U.S. application Ser. No. 17/381,763, filed Jul. 21, 2021, which claims the benefit of U.S. Provisional Application No. 63/054,527, filed Jul. 21, 2020. Priority to U.S. application Ser. No. 17/381,763 and U.S. Provisional Application No. 63/054,527 is hereby claimed. U.S. application Ser. No. 17/381,763 and U.S. Provisional Application No. 63/054,527 are hereby incorporated by reference in their entireties.

TECHNICAL FIELD

Embodiments of the present disclosure relate generally to cooking stations having a griddle intended for outdoor use. More specifically, aspects of the present disclosure relate to grease and food byproduct management methods and systems utilized in conjunction with the griddle and/or cooking station. Further aspects of the present disclosure include providing a griddle station base with various features, such as cabinets, wheels, folding legs, a modular configuration and the like.

BACKGROUND

Outdoor cooking is a popular tradition in much of the world. Outdoor cooking may be achieved via various modes, but the most common systems utilized for cooking outdoors are barbeque grills, devices which cook food by providing heat in an area below a grill or grate. The heat is often provided via two methods: (1) a gas fuel, such as propane, or (2) a solid fuel such as wood and/or charcoal. Other modes include electrical heating elements. These two types of barbeque grills are generally referred to as "gas grills" or "charcoal grills."

A griddle is a cooking device that is used in both residential and commercial applications for a range of cooking methods. While griddles gained prominence in the United States in the $20^{th}$ century as used in commercial establishments such as diners and fast-food restaurants, the use of outdoor griddles was limited. A griddle is commonly a metal plate made of cast or wrought iron, aluminum, or steel. Griddles may be heated by open flame or electrical elements, directly or indirectly. Since a griddle is usually made of a heavy metal, griddles are notoriously difficult to move or otherwise transport. One method utilized in outdoor cooking was to place a small griddle directly on a barbeque grill or over flame burners. However, this method may lead to injury or accident, as there are limited options for controlling or handling a griddle within a barbeque grill.

Cooking on a griddle also produces grease and food byproduct that can accumulate on the solid surface. Some griddles include a drain system to manage the grease, such as a front channel used in commercial griddles at diners or restaurants. A front channel is unsightly and reduces the amount of useable, accessible griddle space for the cook. Front channels also potentially increase the likelihood of grease spillage and build-up over the front side of the cooking station, which may soil a user's clothing. Attaching a collection reservoir to the rear of the griddle can also expose users or passers-by to grease, either by proximity or accidental contact with the reservoir. Furthermore, most or all griddles utilized in residential and commercial settings are open-air cooking surfaces that do not include a lid that covers the entire cooking surface during use. This increases the likelihood that a user's clothes will be soiled by splashing or unanticipated movement of grease or food byproduct during use.

SUMMARY

It is an object, feature, and/or advantage of the present disclosure to provide an improved outdoor griddle station and methods of use thereof that overcome deficiencies in the prior art. In accordance with one exemplary aspect, a cooking system is provided having a heat source containment structure housing with at least one heating element disposed therein. A griddle member is adapted for placement in overlying relation to the heat source containment structure. The griddle member includes an upper side and underside. The upper side defines a cooking surface wherein heat is transferred from the heating element to the food product via the griddle. This cooking surface here provides a heat transfer zone. At least one drain may extend through the griddle member. The drain may include a proximal opening at the upper side and a distal opening below the upper side, and further includes downwardly extending side walls extending in a convex manner from the proximal opening to the distal opening. A fluid transfer assembly may extend downwardly away from the drain or drains in nested relation and fluid communication with the drain or drains. The fluid transfer assembly has a basin element and a downwardly extending hollow duct. The basin element may be oriented in least partial surrounding relation to said downwardly extending sidewalls. A receptacle is disposed below the duct and is adapted to receive and hold food byproducts transported through the fluid transfer assembly. The receptacle may have a box configuration including an open top, a floor, a pair of opposing end walls, and a pair of opposing side walls with the end walls and side walls being disposed around the floor.

BRIEF DESCRIPTION OF THE DRAWINGS

The accompanying drawings, which are incorporated in, and which constitute a part of this specification, illustrate exemplary constructions and procedures in accordance with the present disclosure and, together with the general description of the disclosure given above and the detailed description set forth below, serve to explain the principles of the disclosure wherein.

Figure 1:
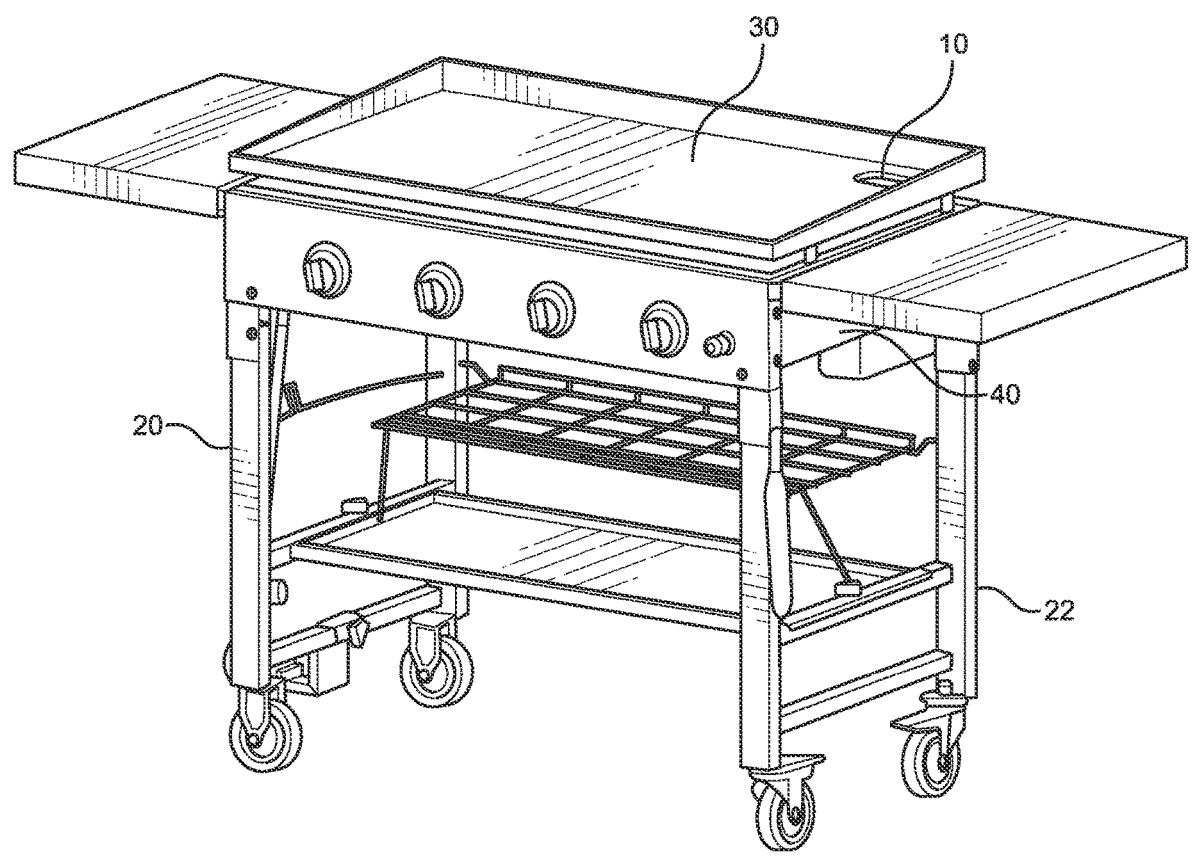
FIG. 1 is a perspective view of a first embodiment of an outdoor griddle station consistent with the present disclosure including a griddle member.

While constructions consistent with the present disclosure have been illustrated and generally described above and will hereinafter be described in connection with certain potentially preferred embodiments and practices, it is to be understood that in no event is the disclosure limited to such illustrated and described embodiments and practices. On the contrary, it is intended that the present disclosure shall extend to all alternatives and modifications as may embrace the general principles of this disclosure within the full and true spirit and scope thereof. Also, it is to be understood that the phraseology and terminology used herein are for purposes of description only and should not be regarded as limiting. The use herein of terms such as "including" and "comprising" and variations thereof is meant to encompass the items listed thereafter and equivalents thereof as well as additional items and equivalents thereof.

DETAILED DESCRIPTION

An outdoor griddle station provides advantages over an indoor griddle station in homes where kitchen space is limited. Many foods cooked on griddles produce excess smoke, which many kitchens are ill-equipped to disperse. Providing a grease management system near the back of the station allows the user to use the front of the station closest to them as a cooking surface, reducing the need to reach over a hot griddle to reach cooking food in the back.

An outdoor griddle station including a separate base and griddle member allows for easier cleaning of the griddle member. The griddle member can also be removed from the base to allow for more compact storage. In one embodiment, the base may be composed of a housing for the heating element arranged in a box shape. This heat source containment structure, or firebox, contains one or more heating elements that apply cooking heat to the heat transfer zone of the griddle member, which functions as the cooking surface.

A griddle member with securing members and griddle walls provides a stable cooking surface and prevents grease from spilling off of the cooking surface. The securing members also maintain the griddle member at an elevated distance above the firebox. Additionally, a griddle member with heat deflecting members on its underside prevents the heat from the heating element from escaping out the sides of the griddle member, which directs more heat towards the griddle surface resulting in more efficient heat transfer. This also prevents escaping heat from overheating the user's tools or anything else adjacent to the outdoor griddle station. Further, a griddle member with reinforcing members on its underside prevents the griddle surface from warping due to consistent exposure to high temperatures from the heating element.

The cooking surface of the griddle member may contain one or more drains having a generally inverse frustoconical geometry. That is, the drain or drains may have an opening of greater area at the top than at the bottom with sloping walls extending between the top and bottom openings. One or more generally elliptical drain openings on the griddle member may be used to collect grease from most spatulas and grease pushers. In this regard, it is to be understood that the terms "elliptical" or "ellipse" means any non-circular geometry with a length to width ratio greater than 1 with rounded or pointed ends and curved or straight lateral sides. The ends and lateral sides may be formed by curved surfaces, collections of straight-line segments, or combinations thereof. The curvature of the ends and any curved lateral sides may be either continuous or discontinuous. By way of example only and not limitation, elliptical openings may include a regular oval shape, a polygon having a pair of parallel line segments connected by a convex curve at each pair of ends, a polygon having two pairs of parallel lines arranged in rectangular fashion with convex curves in place of corners, forming a rounded rectangle, and stretched polygonal shapes such as hexagons, octagons and the like using line segments to provide a length to width ratio greater than 1.

When pushed, grease collects along the edge of a spatula or pusher, causing it to spread out. A rounded opening provides a wider hole to catch more grease while sacrificing less cooking area than a circle or square opening with the same width. The opening of the drain and the sloping portion of the cooking surface adjacent to the drain may be substantially elliptical in shape to prevent grease from building up in any corners. In addition, providing a sloped surface adjacent to the grease opening makes grease collection easier by allowing the grease at the edge of the sloped surface to flow downwards into the rounded opening. Instead of pushing all of the grease through the opening, the user only needs to push the grease to the beginning of the sloped surface for it to be directed to a grease receptacle.

The griddle member may include a raised perimeter wall defining a guard extending upwardly from the cooking surface. This guard is intended to protect users and nearby persons from grease splatter caused by boiling grease. In another nonlimiting exemplary embodiment of the griddle member, the entire cooking surface may be configured to slope toward the opening. When the grease is heated by the cooking surface, its viscosity, and therefore its resistance to flow, is lowered, allowing the hot grease to flow across a surface featuring less slope. In this way, the grease may naturally flow downwards toward and into the drain from any part of the cooking surface.

Providing a grease receptacle located within the base of the outdoor griddle station protects the grease tray from being accidentally knocked off of the station by the user or other passerby, reducing the chance of a mess and/or grease burns. The receptacle may be located below the heat source containment structure for ease of access. The receptacle may also include laterally-extending support flanges extending from the top of the receptacle. The flanges may rest upon a bracket seat attached to the griddle base to permit the receptacle to be removed and replaced. The receptacle may also include a handle attached to an end wall, which may made of a low thermoconductivity material to prevent the handle from becoming hot to the touch. The receptacle may optionally be made of metal such as aluminum, steel or the like capable of holding hot fluids without warping due to heat.

A fluid transfer channel, shaped similar to a funnel, may be attached via a mounting flange attached to the heat source containment structure below the griddle. The fluid transfer channel maximizes the amount of grease collected from the rounded opening and directs the grease to the receptacle. The top of the fluid transfer channel is shaped like a basin, with a wider top opening and narrower bottom opening. The narrower bottom opening is operatively connected to a hollow duct. A wider opening of the proximal end of the basin maximizes the amount of grease collected from the rounded opening, while the duct attached to the narrower distal end of the basin element directs the food byproduct directly to the grease receptacle. Both the basin and the hollow duct have heat shielding properties that allow the grease to flow through the channel, which passes through the heat source containment structure where the cooking heat source is located, without catching fire. The basin element of the fluid transfer assembly may be comprised of a metal such as aluminum or ferrous metal that provides modest heat shielding capacity to prevent grease fires. Because the hollow duct passes closer to the heating element, it may need to offer greater heat shielding than the basin element. In order to supply heat shielding, the hollow tube may be composed of a metal or other material with a thickness sufficient to offer heat shielding sufficient to eliminate the potential for a grease fire. The hollow duct may be cylindrical or elliptical in shape in order to minimize the effect of thermal expansion based on the duct's proximity to a heat source. The basin element may have vertical walls at its upper perimeter extending from the wider top opening to allow one or more drains in the griddle member, which protrude downward from the underside of the griddle member, to nest in the basin member without touching the downward-sloping walls of the basin. Such nesting aids in communicating food byproduct from the surface of the griddle to the fluid transfer assembly without spillage.

In accordance with one exemplary practice, including foldable legs on the outdoor griddle station base allows users to transport the griddle via car. With foldable legs, the griddle can fit in the trunk or back seat of most family cars, whereas non-foldable legs would prevent this. The foldable legs also allow it to take up less space in storage. Optionally including wheels on the base station increases the mobility of the outdoor griddle station. This allows the user to move it to and from a storage area, or to move the griddle to allow for more outdoor space, for example to entertain a dinner party. Optionally including cabinets and shelves on the base station increases the user's utility of the outdoor griddle station, allowing them to store implements such as spatulas, tongs, and towels, keeping everything needed in order to utilize the outdoor griddle station within the outdoor griddle station. Optionally including space for a fuel source increases the user's utility of the outdoor griddle station, allowing the station to occupy less space and allowing a more aesthetically-appealing location to store a fuel tank.

Optionally including space for a fuel source within the outdoor griddle station allows the griddle station to operate absent a direct gas line. This increases the mobility of the station, allowing the user to use it essentially anywhere they can move it provided availability of a propane tank. Keeping the fuel source within the station reduces the amount of space the station and fuel source take up, and also reduces the risk of the user or somebody else bumping into the fuel source or line and disconnecting it. Optionally including a connecting mechanism for a fuel source in the outdoor griddle station allows the griddle to be connected to a gas line, eliminating the need of the user to constantly switch propane tanks.

Optionally including a lid on the outdoor griddle station allows the user to store the griddle outside without debris coming into contact with the griddle surface. Additionally, closing the lid while cooking food on the griddle surface increases the internal temperature and cooks the food from both the bottom and the top, resulting in lower cook times. The incorporation of a thermometer, heating/warming rack, and/or utensil holders with the optional lid provide further advantages.

Referring now to the drawing wherein like numerals refer to like parts in the various views, FIG. 1 is a perspective view of an exemplary embodiment of an outdoor griddle station. The illustrated exemplary griddle station includes an elliptical drain opening 10 located near the rear of a griddle member 30. In the illustrated construction, a base 20 includes a heat source containment structure 40 housing at least one heat source therein. Legs 22 may be used to raise the height of the cooking surface.

Figure 2:
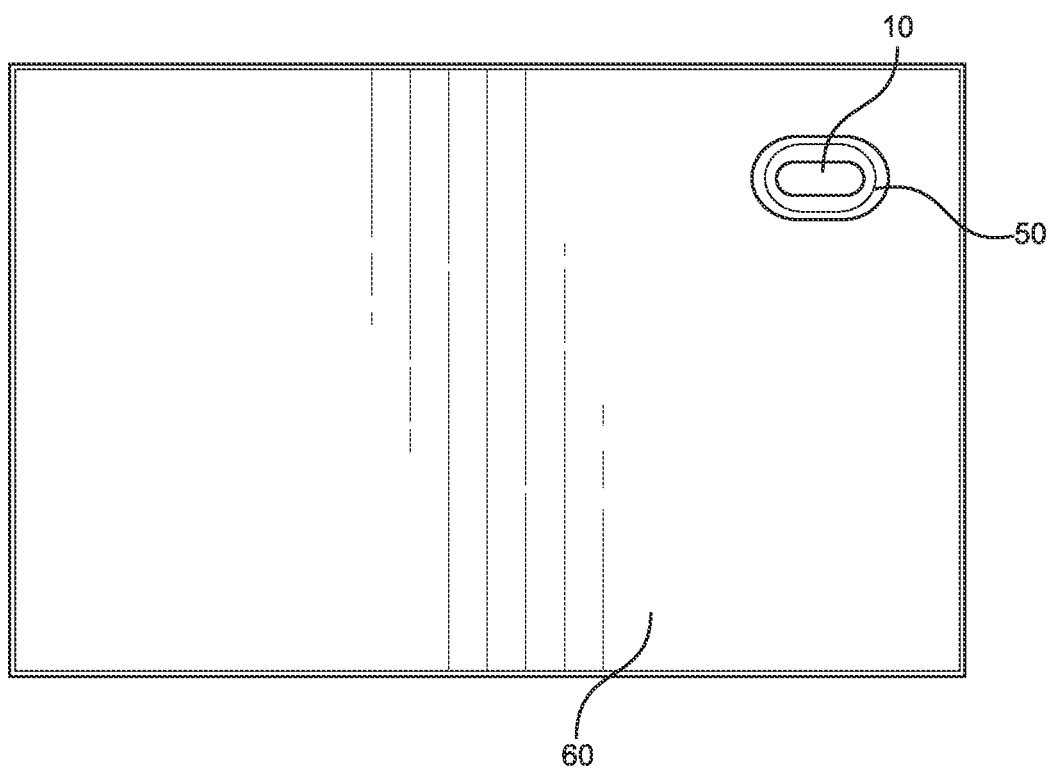
FIG. 2 is a top view of an exemplary griddle member of the outdoor griddle station in FIG. 1.
Figure 3:
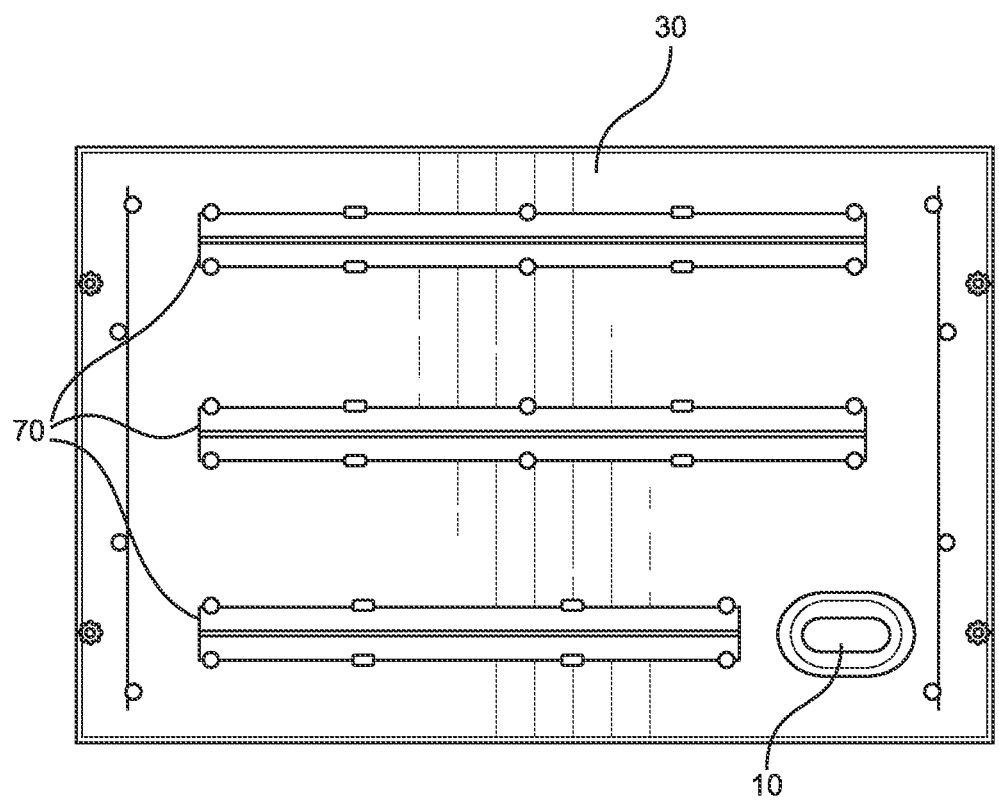
FIG. 3 is a bottom view of the exemplary griddle member of FIG. 2.
Figure 4A:
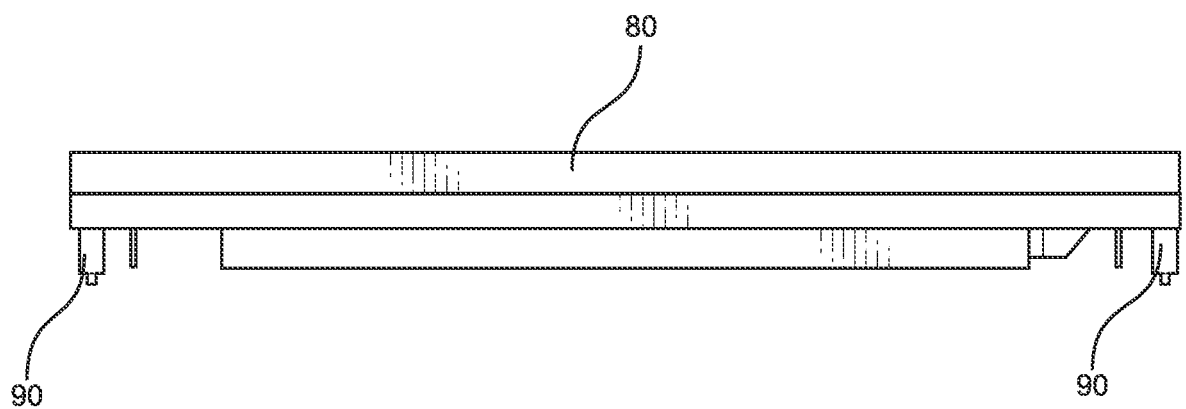
FIG. 4A is a forward edge view of the exemplary griddle member of FIGS. 2 and 3.
Figure 4B:
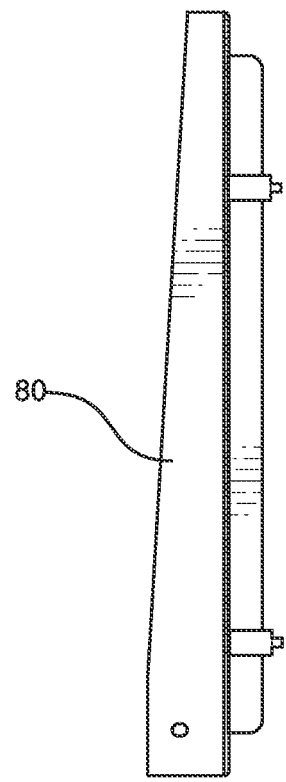
FIG. 4B is a lateral side view of the exemplary griddle member of FIGS. 2 and 3.
Figure 5:
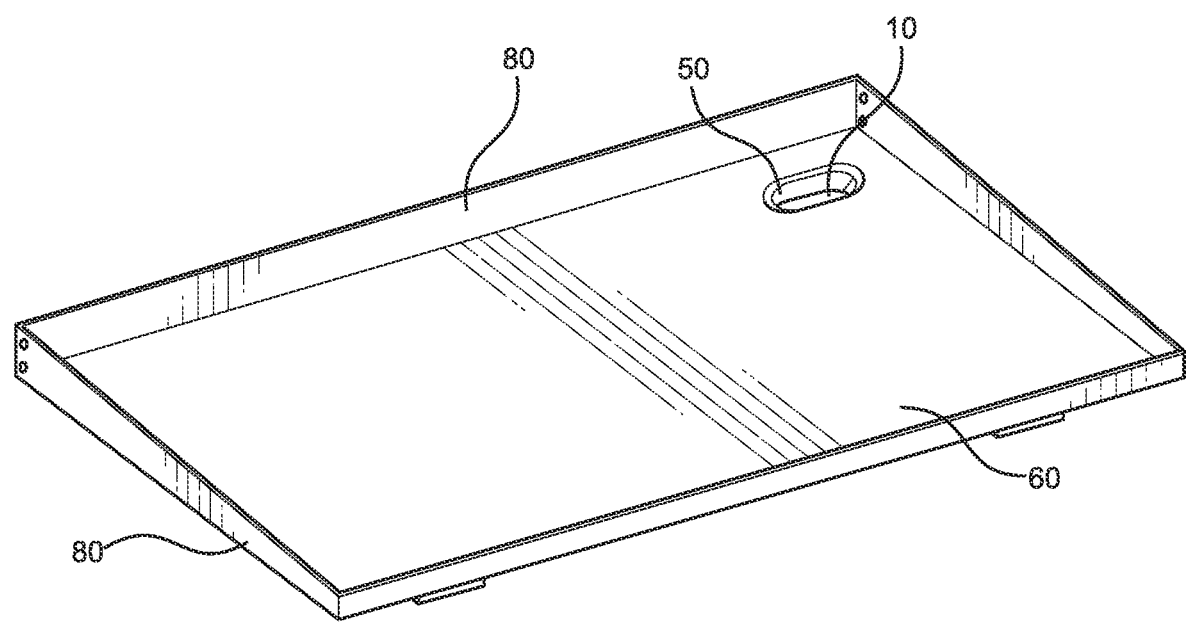
FIG. 5 is a perspective view of the exemplary griddle member of FIGS. 2 and 3.
Figure 6:
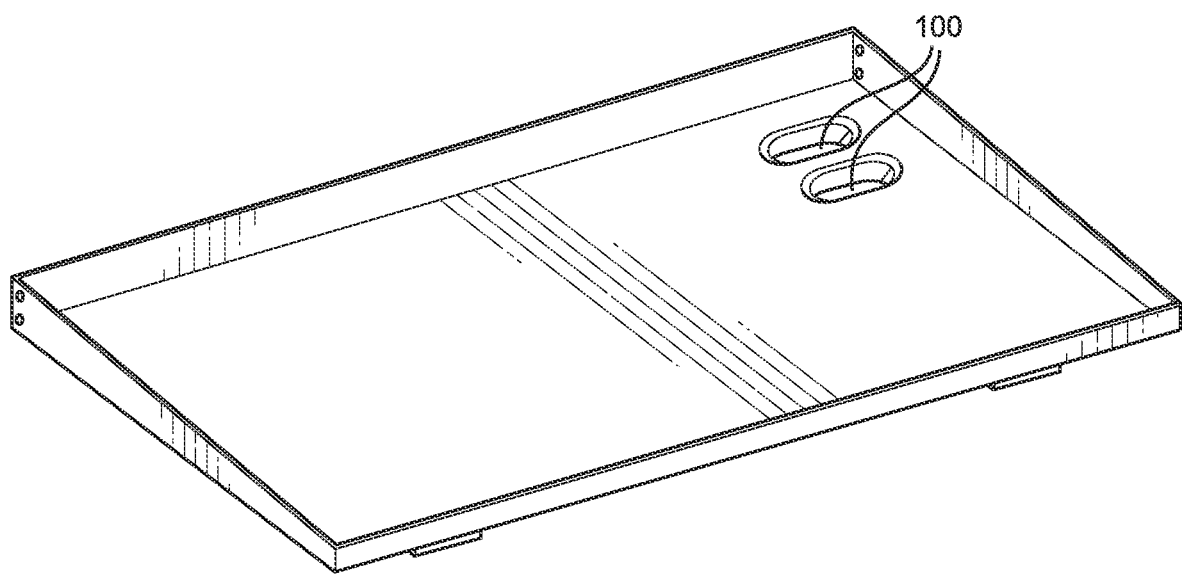
FIG. 6 is a perspective view of an alternative exemplary griddle member featuring multiple openings.

As seen in FIGS. 2, 5 and 6, the griddle member includes a heat transfer zone 60 outboard from the elliptical drain opening 10. As shown, the elliptical drain opening 10 is at least partially surrounded by downwardly extending sloped sidewalls defining a sloped surface 50 extending downwardly from the cooking surface formed by the heat transfer zone 60. The proximal opening at the top of the sloped surface 50 is larger than the distal end of the sloped surface, which terminates at the drain opening 10. As best seen in FIG. 3, reinforcing members 70 may be disposed across the underside of the griddle member 30 to maintain its shape under the stress of high temperatures. As shown in FIG. 6, multiple drain openings 100 may be used if desired.

Figure 7:
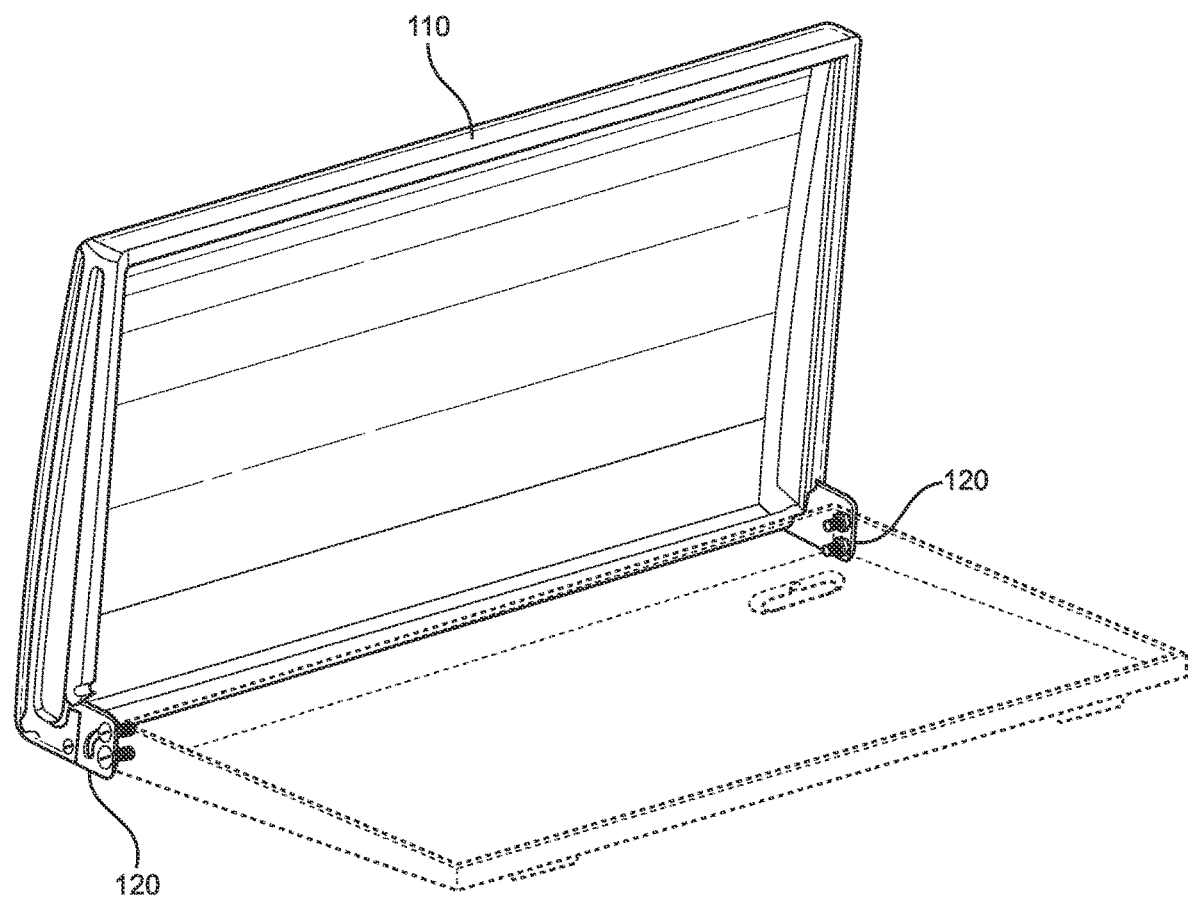
FIG. 7 is a perspective view of the optional griddle lid.

If desired, a hinging griddle lid 110 may be provided (FIG. 7). As shown, in the illustrated exemplary construction hinges 120 may be used to attach the griddle lid to the splatter guard 80 and allow the griddle lid 110 to open and close.

Figure 8:
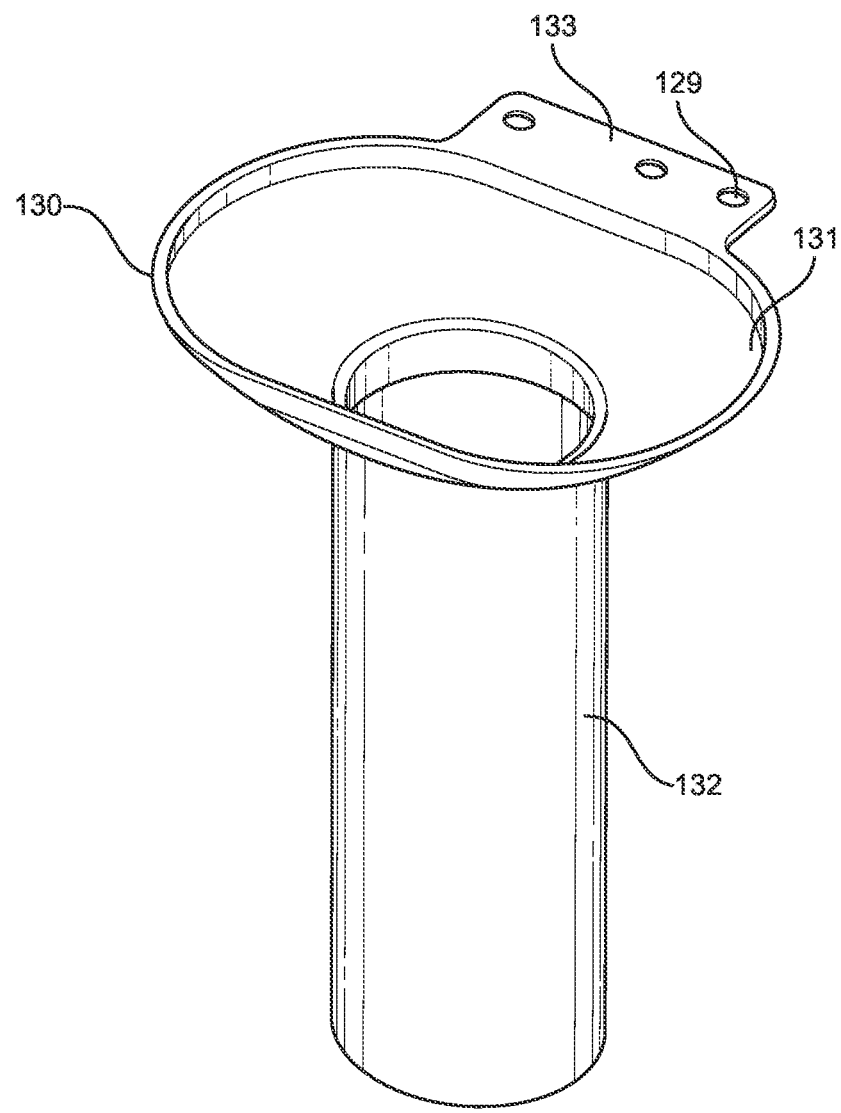
FIG. 8 is a perspective view of an exemplary fluid transfer assembly comprising a basin element and hollow duct element.
Figure 9:
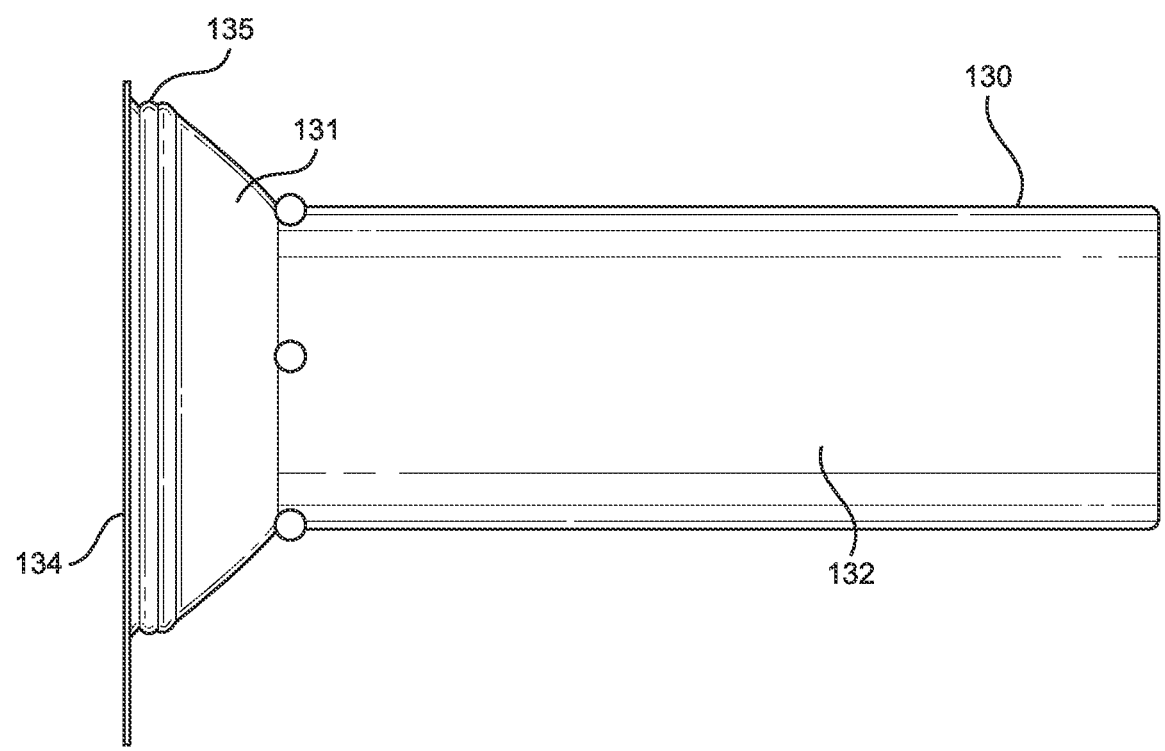
FIG. 9 is a schematic side view of the fluid transfer assembly illustrated in FIG. 8.
Figure 10:
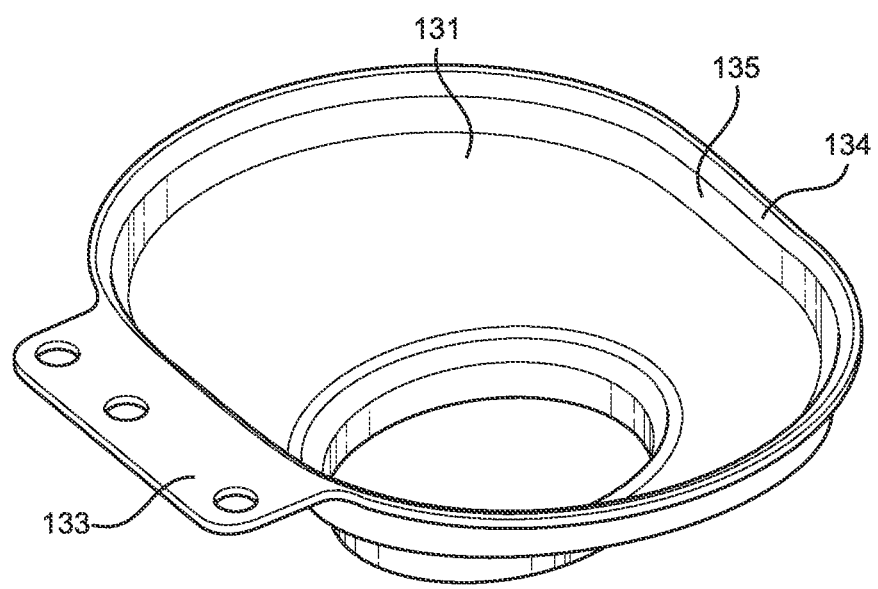
FIG. 10 is a perspective view of the basin element of the fluid transfer assembly in FIG. 9.

As noted previously, a fluid transfer assembly 130 may be used to capture and convey waste away from the drain opening 10. As illustrated in FIGS. 8 and 9, in one exemplary construction the fluid transfer assembly 130 includes a basin element 131 and attached to a hollow duct 132 defining a downwardly extending stem. A mounting flange 133 extends radially way from the basin element 131 and may be used to attach the fluid transfer assembly 130 to the heat source containment housing 40 using bolts or screws (not shown) through attachment openings 129. As best seen in FIG. 9, the mounting flange 133 extends outwardly from the wider proximal opening 134 of the basin element 131. This exemplary embodiment of the basin element 131 also shows vertical perimeter walls 135 extending downward from the proximal opening 134 defined by the free upper edge of the basin element to a sloped annular surface. As will be appreciated, the vertical perimeter walls 135 around the proximal opening of the basin element 131 aid in establishing a nesting relation between the downwardly extending sloped surface 50 and the interior of the fluid transfer assembly 130 without abutting the sloped annular surface at the interior of the basin element 131 of the fluid transfer assembly 130. That is, vertical perimeter walls 135 may act as a spacer to hold the exterior of the sloped surface 50 slightly away from sloped annular surface of the basin element of the fluid transfer assembly 130.

Figure 11:
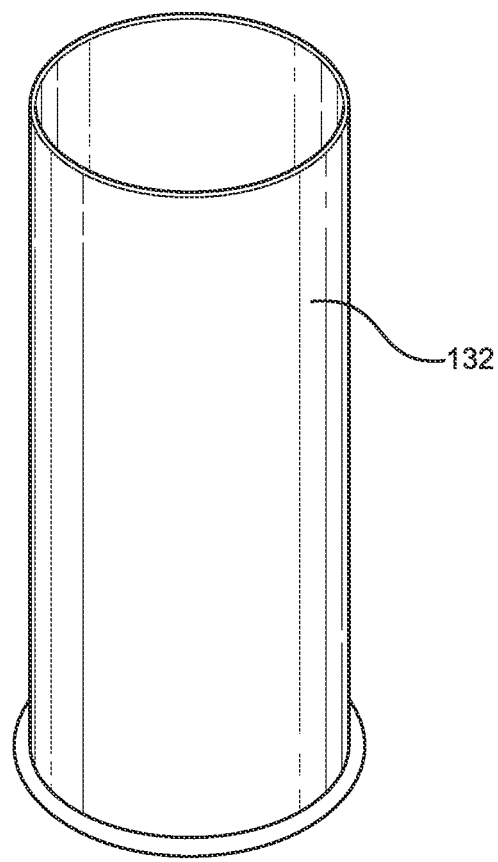
FIG. 11 is a perspective view of the hollow duct element of the fluid transfer assembly in FIG. 9.

As seen in FIG. 11, the hollow duct 132 of the fluid transfer assembly 130 may be a substantially straight pipe of substantially uniform diameter connected directly to the distal opening of basin element 131 by welding, mechanical attachment, or other suitable technique. However, it is likewise contemplated that the duct 132 may be curved and/or have a variable diameter if desired.

Figure 12:
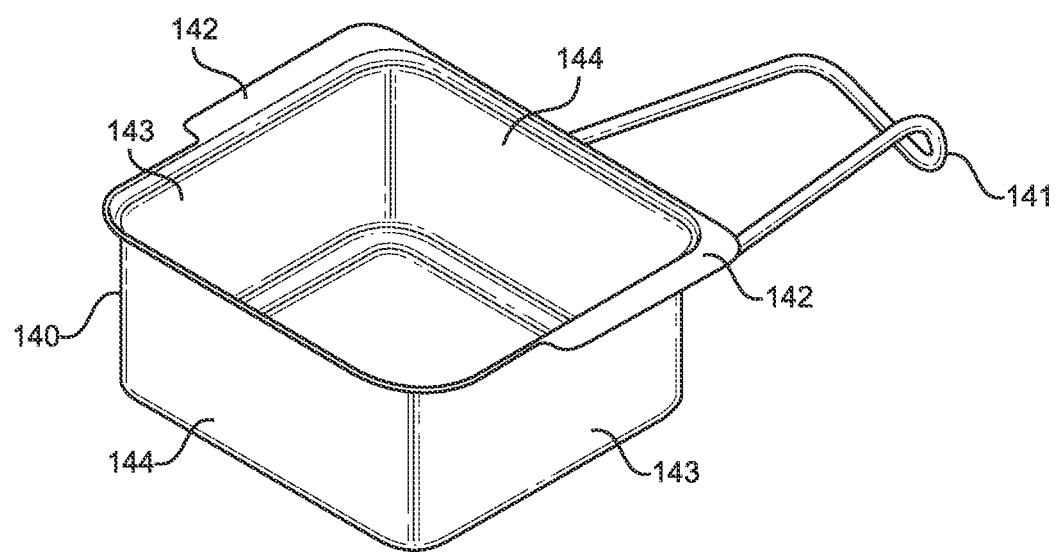
FIG. 12 is a perspective view of an exemplary grease receptacle assembly.

The hollow duct 132 provides fluid connection between basin element 131 and a grease receptacle assembly 140 (FIG. 12). In the illustrated exemplary construction, grease receptacle assembly 140 includes side walls 143 and end walls 144 extending upward to form a box configuration adapted to hold fluid without leaking. Support flanges 142 extend laterally from the top of the side walls 143 that allow the receptacle 140 to be removably supported by a bracket seat 150. A handle 141 is attached to one of the end walls 144 to enable the receptacle 140 to be removed from and replaced into the bracket seat 150.

Figure 13:
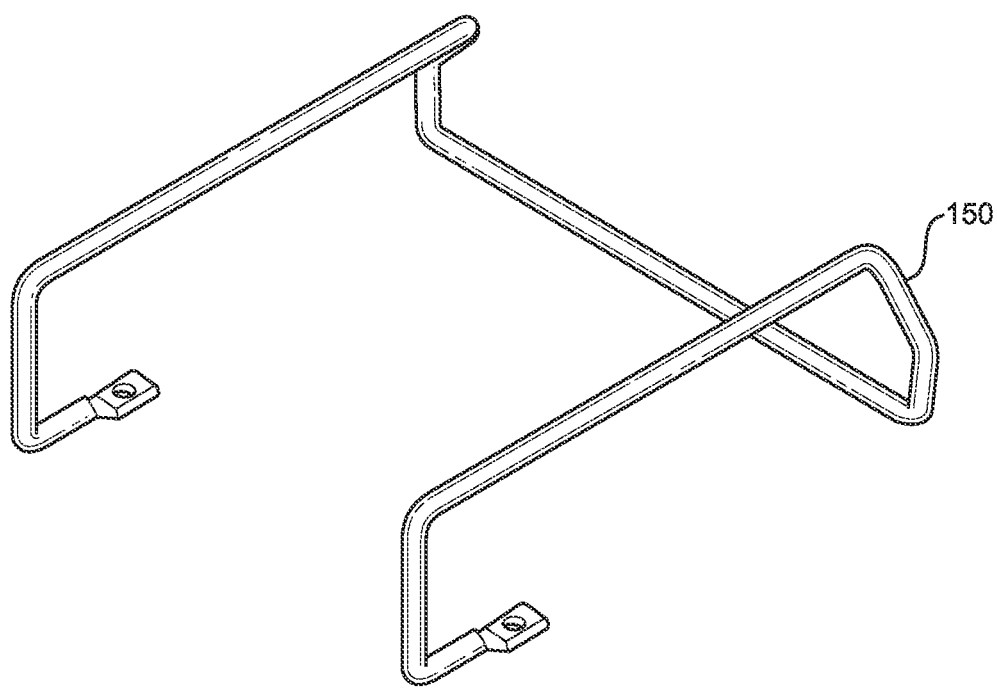
FIG. 13 is a perspective view of an exemplary bracket seat for the grease receptacle assembly of FIG. 12.
Figure 14:
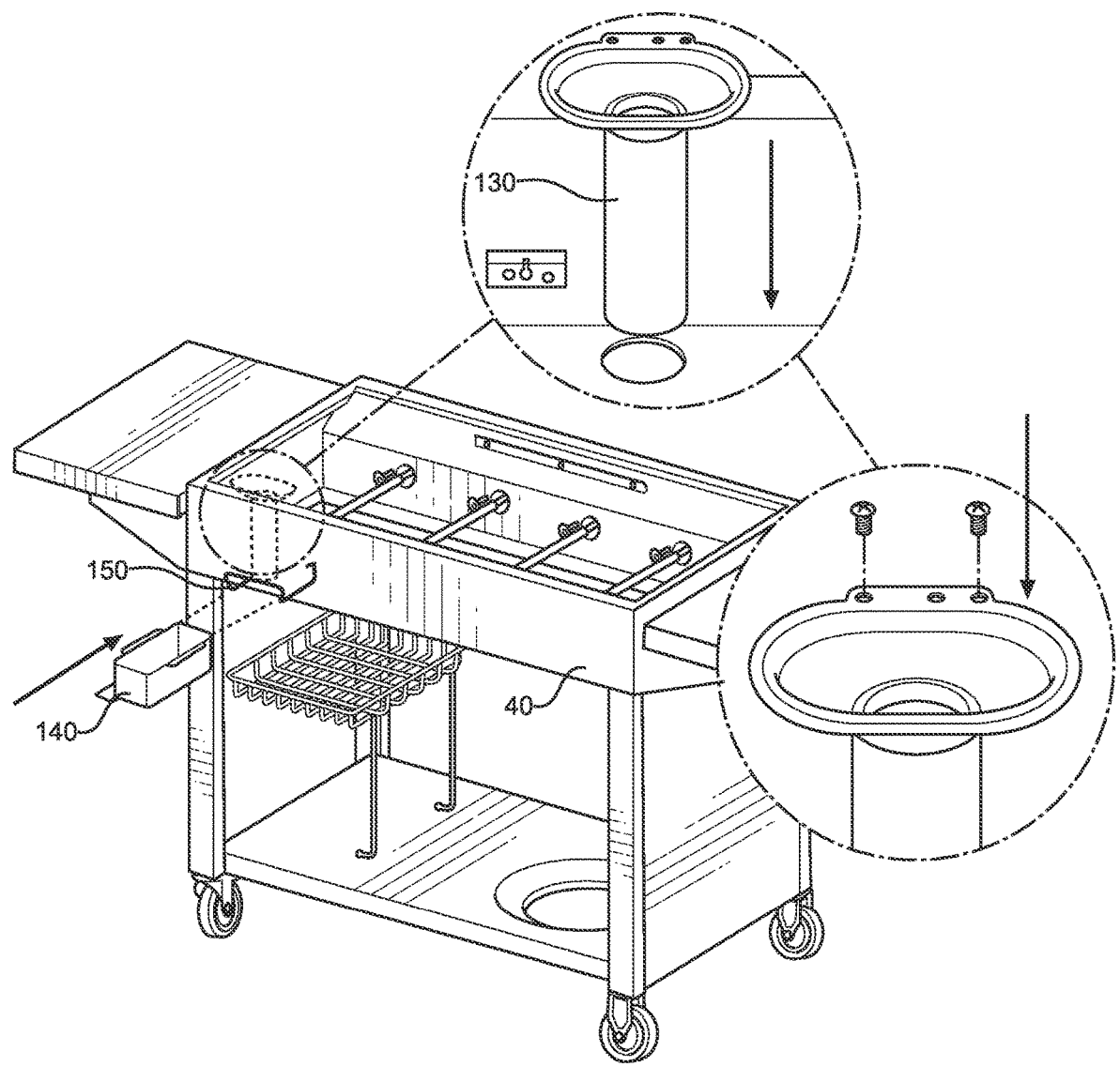
FIG. 14 is perspective view of an embodiment of an exemplary cooking station with the griddle member removed illustrating exemplary placement of the fluid transfer assembly of FIG. 9 and bracket seat of FIG. 13 for the grease receptacle assembly of FIG. 12.

FIG. 14 is perspective view of an embodiment of the cooking station showing the placement of the fluid transfer assembly 130 from FIG. 8 and bracket seat 150 from FIG. 13 onto the heat source containment structure 40. The receptacle 140 from FIG. 12 may be held in place by the bracket seat 50, which places the receptacle in position to receive grease and other food by products from the cooking surface of the griddle member 30, which passes through the fluid transfer assembly 130.

Figure 15:
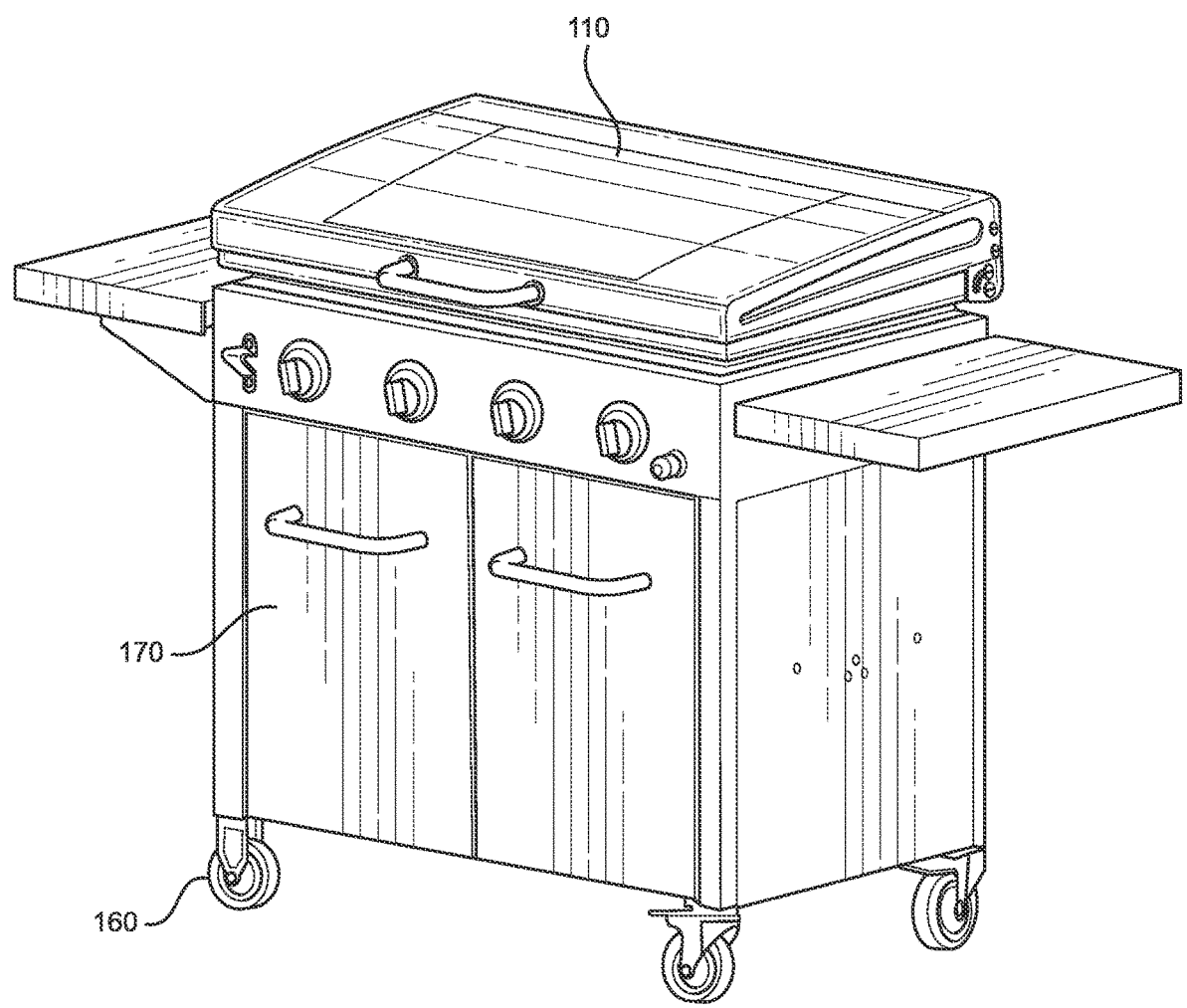
FIG. 15 is perspective view of an exemplary embodiment of an outdoor griddle station including a hinging lid and cabinet.

FIG. 15 is perspective view of an embodiment of an outdoor griddle station including cabinet doors 170 attached to the legs of the griddle base 20 to form an enclosed storage space. Wheels 160 may be attached to the legs of the griddle base 20 to enhance mobility of the griddle station.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the disclosure (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the disclosure and does not pose a limitation on the scope of the disclosure unless otherwise claimed. No language in the specification should be construed as indicating any non-claimed element as essential to the practice of the disclosure.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate, and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. A cooking system comprising:
    a heat source containment structure housing at least one heating element disposed therein;
    a griddle member adapted for placement in overlying relation to said heat source containment structure, the griddle member including an upper side and underside, the upper side defining a cooking surface comprising a cooking surface and at least one drain extending through said griddle member, with a proximal opening and a distal opening, said at least one drain further including downwardly extending side walls extending from the proximal opening to the distal opening wherein the proximal opening of said at least one drain has a greater circumference than the distal opening of said drain;
    a fluid transfer assembly extending downwardly away from said drain in nested relation to and directly beneath said at least one drain and in fluid communication with said at least one drain, the fluid transfer assembly having a proximal opening and a distal opening having smaller dimensions than said proximal opening, wherein said fluid transfer assembly is not fixed to said drain; and
    a receptacle disposed below said distal opening of the fluid transfer assembly and adapted to receive and hold food byproducts transported through the fluid transfer assembly, said receptacle having a box configuration including an open top, a floor, a pair of opposing end walls, and a pair of opposing side walls, said end walls and side walls being disposed around the floor, wherein the dimensions of said open top are greater than the dimensions of said distal opening of said fluid transfer assembly.

2. The cooking system as recited in claim 1, wherein a plurality of support members are affixed to the underside of said griddle member.

3. The cooking system as recited in claim 1, wherein said proximal opening of each said at least one drain has an effective length dimension and width dimension wherein said length dimension is at least 1.5 times the length of said width dimension.

4. The cooking system as recited in claim 1, wherein each said at least one drain includes an elliptical perimeter at the upper side.

5. The cooking system as recited in claim 1, wherein said griddle member further includes a raised perimeter wall defining a splatter guard extending upwardly from the perimeter of the heat transfer zone.

6. The cooking system as recited in claim 1, wherein said fluid transfer assembly comprises metal.

7. The cooking system as recited in claim 6, wherein said fluid transfer assembly comprises ferrous metal.

8. The cooking system as recited in claim 1, wherein said fluid transfer assembly includes at least one mounting flange extending laterally from the perimeter of said proximal opening of said fluid transfer assembly, said mounting flange configured to affix said fluid transfer assembly to said heat source containment structure.

9. The cooking system as recited in claim 1, wherein said receptacle comprises metal.

10. The cooking system as recited in claim 1, wherein said receptacle further includes a handle attached to an end wall.

11. The cooking system as recited in claim 10, wherein said receptacle further includes support flanges extending laterally away from upper edges of said opposing side walls, said support flanges being adapted to support said receptacle in sliding relation to a bracket attached to said heat source containment structure.

12. The cooking system as recited in claim 1, wherein the cooking surface is sloped inwardly from opposing lateral sides toward said at least one drain.

13. The cooking system as recited in claim 1, wherein said griddle member includes a plurality of drains.

14. The cooking system as recited in claim 1, wherein said downwardly extending side walls of at least one drain extend from the proximal opening to the distal opening in a convex manner.

15. A cooking system comprising:
- a heat source containment structure housing at least one heating element disposed therein;
- a griddle member adapted for placement in overlying relation to said heat source containment structure, the griddle member including an upper side and underside, the upper side defining a cooking surface comprising a cooking surface and a drain extending through said griddle member, with a proximal opening and a distal opening, said drain further including downwardly extending side walls extending from the proximal opening to the distal opening in convex manner wherein the proximal opening of said drain has a greater circumference than the distal opening of said drain, said griddle member further including a raised perimeter wall defining a splatter guard extending upwardly from the perimeter of the heat transfer zone;
- a metal fluid transfer assembly extending downwardly away from said drain in nested relation to and directly beneath said drain and in fluid communication with said drain, the fluid transfer assembly having a proximal opening and a distal opening having smaller dimensions than said proximal opening, wherein said fluid transfer assembly is not fixed to said drain, said fluid transfer assembly including at least one mounting flange configured to affix said fluid transfer assembly to a heat source containment structure and being disposed in at least partial surrounding relation to said downwardly extending sidewalls; and
- a metal receptacle disposed below said distal opening of the fluid transfer assembly adapted to receive and hold food byproducts transported through the fluid transfer assembly, said receptacle having a box configuration including an open top, a floor, a pair of opposing end walls, and a pair of opposing side walls, said end walls and side walls being disposed around the floor, said receptacle further including a handle attached to an end wall and support flanges extending laterally away from upper edges of said opposing side walls, said support flanges being adapted to support said receptacle in sliding relation to a bracket attached to said heat source containment structure.

* * * * *